Jan. 25, 1955 G. I. THOMAS 2,700,504

ELECTRONIC DEVICE FOR THE MULTIPLICATION OF BINARY-DIGITAL NUMBERS

Filed Oct. 24, 1950 3 Sheets-Sheet 1

INVENTOR:
G. I. THOMAS
ATTORNEYS:
Moore and Hall

INVENTOR:
G. I. THOMAS
ATTORNEYS:
Moore and Hall

INVENTOR:
G. I. THOMAS
ATTORNEYS:
Moore and Hall

United States Patent Office 2,700,504

Patented Jan. 25, 1955

2,700,504

ELECTRONIC DEVICE FOR THE MULTIPLICATION OF BINARY-DIGITAL NUMBERS

Graham Isaac Thomas, Hollinwood, England, assignor to National Research Development Corporation, London, England, a British corporation Application October 24, 1950, Serial No. 191,885

Claims priority, application Great Britain October 31, 1949

6 Claims. (Cl. 235—61)

Figure 1A:
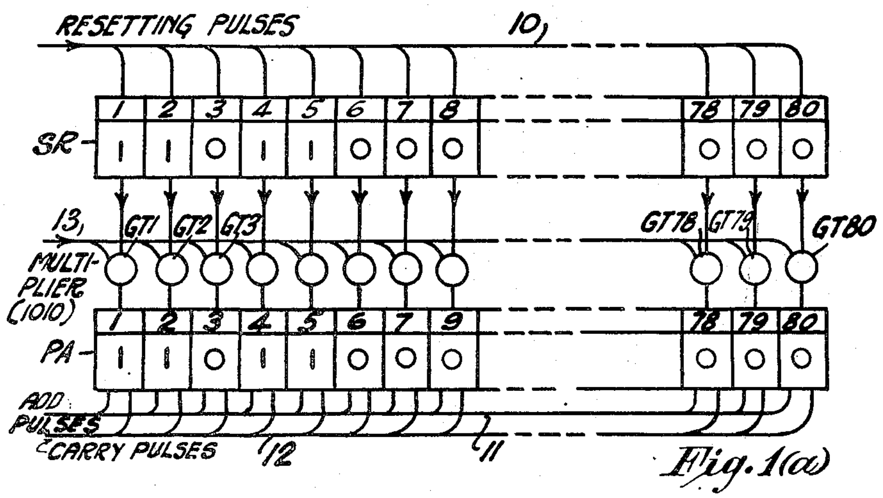

This invention relates to electronic devices and circuit arrangements for performing the operation of multiplication between two binary-digital numbers, one or both of which exists in dynamic form in the serial mode, i. e. as a temporal series of electrical pulse signals.

A number N is represented in the binary scale of notation by the summation of $n$ digital terms:

$$N=\sum_{k=0}^{k=n-1} a_k 2^k$$

where $a_k$ is either "0" or "1." In the dynamic representation of such a number the significance, "0" or "1," of each term may be represented by a simple convention, for example, by the presence or the absence of an electrical pulse signal, while the order of each term may be defined by the spatial or temporal occurrence of the corresponding pulse signal. If a number is represented in the parallel form, all the digital pulses will occur simultaneously each in a separate channel, while in the serial form of representation all the pulses will occur in a single channel, the time of occurrence of any one pulse indicating the order or significance of the corresponding digit. A composite pulse group representing a number with a given number of digits will be of fixed length and will be referred to as a "word."

The product of two binary-digital numbers, D (the multiplicand) and R (the multiplier), is given by:

$$R\times D=\sum_{k=0}^{k=n-1} (a_k 2^{k\times D})$$

where $a_k$ represents the significance of a digit of the multiplier. It can be seen that the process of multiplication in the binary scale thus resolves itself into the summation of a series of terms, each term representing the binary-digital number resulting from an operatoin performed between the multiplicand (itself a summation) and a single digit of the multiplier. The operation performed each time is the multiplication of the multiplicand by zero or by an appropriate power of 2 depending upon whether the corresponding digit of the multiplier is a "0" or a "1." Multiplication of a binary number by a power of 2 does not alter the form of the number but merely implies a temporal or spatial shift of the digital representation of the number by an appropriate number of digital positions in the direction of greater significance. Thus delaying the dynamic representation of a number in serial form by one inter-digit-period is equivalent to the multiplication of the number by $2^1$ and delay by $n$ inter-digit periods is equivalent to multiplication by $2^n$. Similarly, multiplication by $2^n$ of a number represented dynamically or statically in parallel form merely involves the shifting of each digital representation by $n$ channels in the direction of greater significance. It will be apparent therefore that the product of two $n$-digit binary numbers is a $2n$-digit binary number.

Numbers which exist dynamically in serial or parallel form may be represented statically by a register which may comprise a series of electronic trigger circuits, one for each digit to be represented. Such a register may be constructed as a shifting register by coupling the trigger circuits in such a fashion that application of resetting signal to all the trigger circuits in parallel results in the production, by each circuit which reverted to the "0" state from the "1" state, of a signal which causes the next trigger circuit in the chain to assume the "1" state. A number recorded in static form in such a register may thus be multiplied by a desired power of 2 simply by application of the required number of shift or resetting pulses.

Some known circuit arrangements for performing the multiplication of two binary-digital numbers operate by performing the sequence of additions, with multiplication of the addends by appropriate powers of 2, all in the serial form. Such a form of multiplier is described in the specification of patent application Serial No. 149,224 by F. C. Williams et al., filed March 13, 1950, and in the arrangement described therein the multiplicand has to be expressed as a dynamic "word" in serial form once for every "1" digit in the multiplier. Significant increases of operating speed can only be obtained by performing some of the operations involved in the multiplication process in parallel form. If all the series additions are performed in parallel i. e. each addition in serial form but all the serial additions simultaneously, then an adding circuit is required which is capable of adding several digits simultaneously with the simultaneous generation of "carry" digits over several places. Alternatively the multiplicand may be put into parallel form and parallel additions performed sequentially. Combinations of the two methods might be employed.

It is the object of the present invention to provide means for carrying out the process of multiplication between two binary-digital numbers which is capable of operating at higher speed than known multiplying arrangements by performing the necessary steps of addition in the parallel form.

According to the present invention an electronic multiplying circuit for use with binary-digital numbers, each of $n$ digits, comprises a shifting register of $2n$ stages into which the multiplicand is initially loaded and a parallel adder of $2n$ stages, corresponding stages of the shifting register and parallel adder being coupled through gate circuits which are conditioned by the "1" digits of the multiplier which are fed in serial form to all the gates in parallel so that each "1" digit of the multiplier word causes the content of the shifting register to be applied as an addend input to the parallel adder, means being provided to cause the content of the shifting register to be moved by one stage during each inter-digit period of the multiplier word.

Figure 1B:
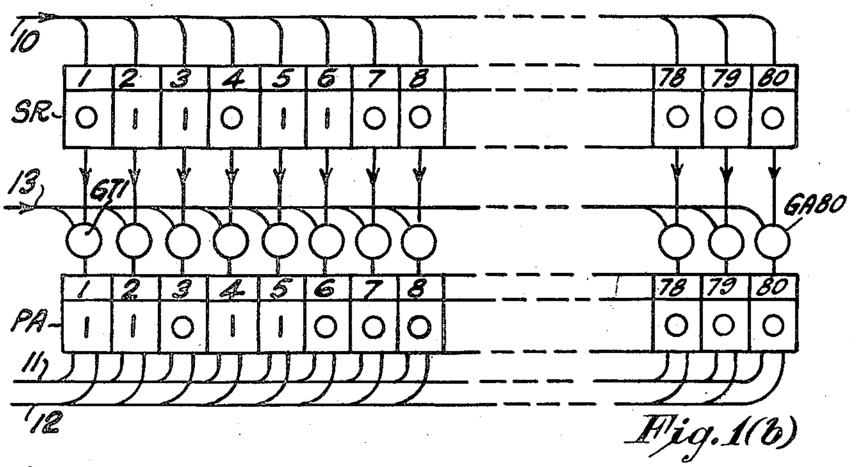
Figure 1C:
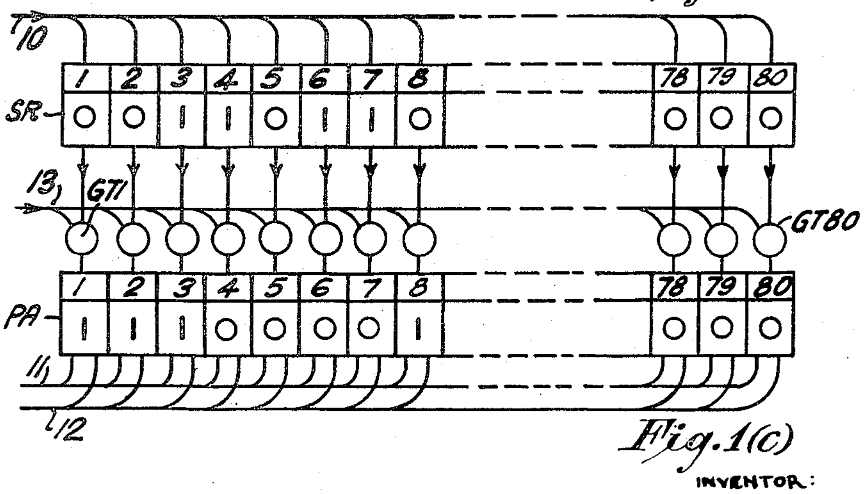

In order that the various features of the invention may be more readily understood it will now be described by way of example with reference to the accompanying drawings in which:

Figs. 1(*a*), 1(*b*) and 1(*c*) form a series of functional diagrams of a multiplier circuit arrangement in accordance with the invention.

Figure 2:
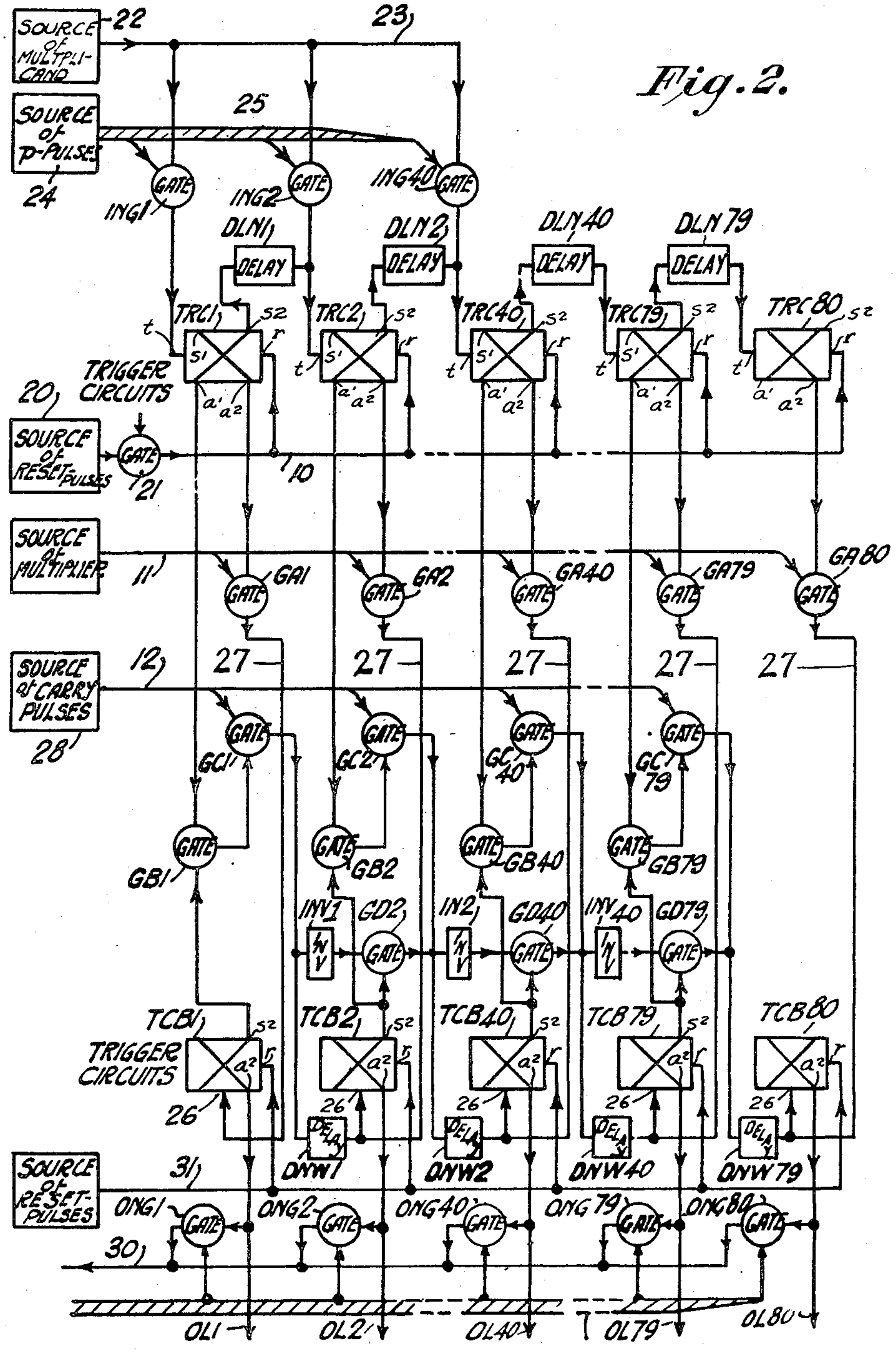

Fig. 2 illustrates, in block schematic form, one practical embodiment of the invention.

Figure 3:
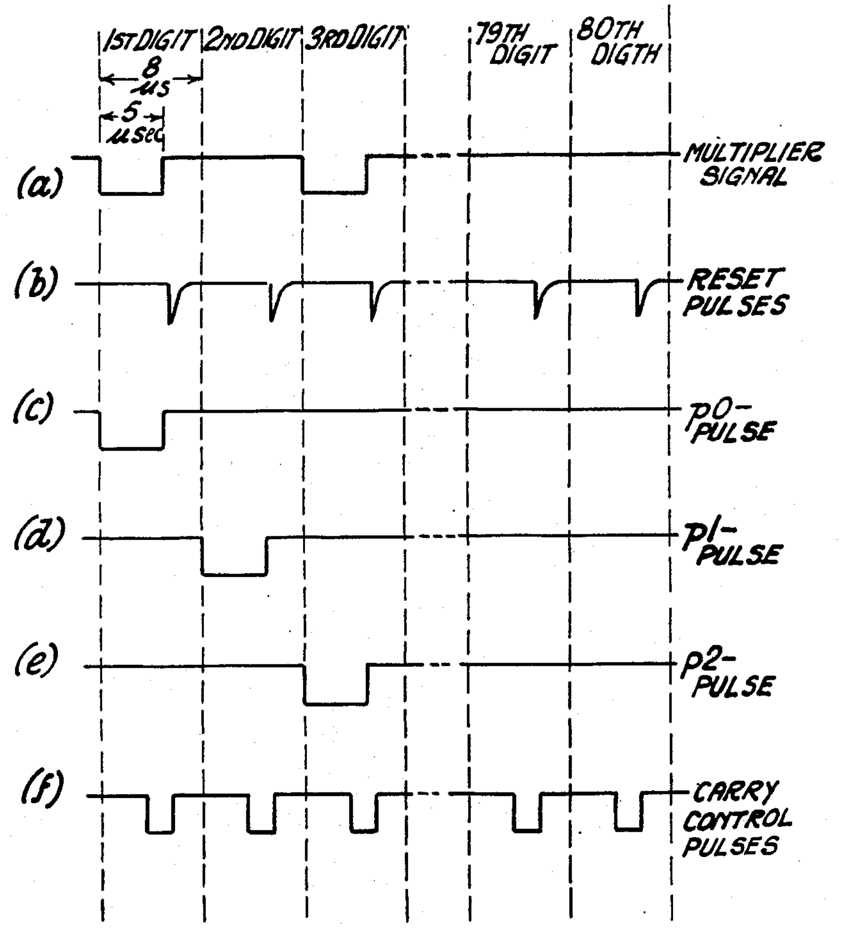

Fig. 3 comprises a series of diagrams illustrating certain waveforms occurring in the embodiment of Fig. 2.

The broad principle of the invention will first be described with reference to Figs. 1(*a*)–(*c*) which are each similar diagrammatic representations of a number of the essential elements of a multiplier for a computing machine operating with 40-digit number words and which serve respectively to indicate the configuration of the digits standing in different elements of such multiplier at the end of the first three sequential steps of a multiplying operation.

The multiplier comprises a shifting register or shifting staticisor SR and a parallel adder PA. The shifting register comprises 80 stages, 1–80, each of which includes a staticisor element or trigger circuit which is capable of being set to either of two states indicative of "0" and "1" respectively and providing a corresponding steady output voltage level. Resetting or shifting pulses fed in parallel over lead 10 to all the stages of this register SR cause any configuration set up in the register to be shifted one place in the direction of greater significance for each resetting pulse i. e., to the right in the diagram. Throughout this specification the binary numbers quoted will be written with the least significant digit to the left so that reading thereof towards the direction of greatest significance is from left to right. The parallel adder PA comprises 80 stages, 1–80, each stage including a single digit register and other logical circuit elements so arranged that when a binary digital number is fed in parallel to the adder, each digit to the appropriate stage, the number is added to the number previously standing in the adder, all the pairs of digits being added simultaneously generally under the control of an "add" control pulse fed in parallel to all stages by way of lead 11. The "carry" digits generated as a result of the additions thus made are added in to the sum by a secondary operation, generally under the control of a special "carry" pulse signal fed in parallel to all stages by way of lead 12, and are propagated rapidly to their correct positions in the adder. The whole process of parallel addition and carry propagation may be achieved within the time period required for the dynamic representation of a single digit.

The output from each stage of the shifting register SR is connected by way of a normally closed gate circuit, GT1, GT2–GT80 to the addend input of the corresponding stage of the parallel adder PA. The control connections of the gates GT1–GT80 are connected in parallel to lead 13 which is supplied with the multiplier word signal in serial form so that each of the normally closed gates is opened for the duration of every "1" representing digit signal in the multiplier word.

Before the operation of multiplication commences the multiplicand is placed in the shifting register SR so that its digits occupy the 40 least significant (i. e. left hand) stages.

If now the multiplier word is fed to the control lead 13 of the gates GT1, GT2–GT80 and the shift or reset control lead 10 of the register SR is simultaneously fed with a train of resetting pulses which occur in the intervals between digit positions in the multiplier word, the multiplicand word, effectively multiplied by the appropriate power of 2, will be applied to the parallel adder and added to the existing content thereof on the occurrence of every "1" digit in the multiplier in a manner to cause the final product to be built up in the sum register of the adder PA. Suitably timed "add" and "carry"-pulse waveforms are, of course, applied to the adder PA at the same time.

The mode of operation of the multiplier may be more clearly understood by reference to the numerical examples given on each of the shifting-register and parallel adder stages in Figs. 1(*a*)–(*c*) which indicate the configuration of digits standing in the register SR and also in the adder at the end of the first three sequential steps of a multiplication. In Fig. 1(*a*) the multiplicand 1101100—00 is indicated in its initial position in the register SR, its least significant digit being located in the first stage of the register while the first digit "1" of the multiplier 10100—00 has been fed to the gates GT1, GT2–GT80. The multiplicand has therefore been passed to the adder, which initially contained zero, and therefore rests in the sum register or parallel adder PA as indicated, the first digit of the final product being held in the first stage of the adder. At the end of this first step the multiplicand held in the shifting register SR is shifted by one place under the control of a resetting pulse over lead 10 so that it then occupies the position indicated in Fig. 1(*b*), the first stage of the register SR registering "0." On the occurrence of the second digit ("0") of the multiplier the gates GT1, GT2–GT80 will not be opened so that the content of the sum register of the adder PA will remain unchanged as indicated, the second digit of the final product being held in the second stage of the sum register. The multiplicand held in the register SR is then shifted by a further place to the position indicated in Fig. 1(*c*) and on the occurrence of the third digit ("1") of the multiplier the gates GT1, GT2–GT80 will be again opened and the content of the register SR will again be added to the content of the sum register of the adder PA to give the result indicated in Fig. 1(*c*), the third digit of the final answer being held in the third stage of the sum register. It will be apparent that this process may be extended until the full 40 digits of the multiplier word have been utilized, when the product will occupy the full 80 stages of the sum register.

One practical embodiment of the invention in which the shifting register is effectively combined as part of the addend register of the parallel adder is shown, in block schematic form in Fig. 2 which will now be described with additional reference to the waveform diagrams of Fig. 3.

This embodiment is particularly adapted for incorporation within a computing machine of the general type described in the specification of copending patent application Serial No. 165,434 by F. C. Williams et al., filed June 1, 1950, and reference should be made to such specification for further information regarding the general nature and generation of certain of the waveforms referred to herein.

This present embodiment is adapted to operate with 40-digit numbers in serial form and having, in their dynamic form of representation, a digit repetition period of the order of 8 microseconds. A "1" digit is represented by a 5 microsecond pulse and a "0" digit by the absence of such a pulse in the relevant pulse position of the pulse train signal representing a number word. Diagram (*a*) of Fig. 3 illustrates the dynamic form of the number 1010—00 constituting the multiplier number previously used in connection with Figs. 1(*a*)–(*c*).

Referring now to Fig. 2, the shifting register SR of the arrangement of Figs. 1(*a*)–(*c*) is constituted by a plurality of electronic trigger circuits TRC1, TRC2–TRC80, for example, of the Eccles-Jordan type, one for each of the 80 stages of the rigister.

Such Eccles-Jordan type trigger circuits are well known and are described, for example, in "Ultra High Frequency Techniques" by Brainerd et al., 1942, pages 171–176. A particularly suitable circuit is that shown in Figures 4–8 of that publication and which is arranged to require separate negative-going triggering voltages to reverse its condition (*a*) to one in which the left hand valve is cut off and the right hand valve is turned on, and (*b*) back to one in which the right hand valve is cut off and the left hand valve is turned on. For ease of understanding in the following specification, the first condition (*a*) set out above will be referred to as the "triggered" condition and is brought about by the application of a "triggering" input on the left hand terminal *t* of the symbols shown in Figure 2, whereas the condition (*b*) above referred to will be termed the "reset" condition and is brought about by application of a "resetting" input to the right hand terminal *r* of the same symbols. Related to the aforesaid Figures 4–8 of the reference, such "triggering" and "resetting" input terminals are those connected respectively to the control grids of the left and right hand valves. In each case the input voltages are applied through a differentiating circuit as is also described on page 176 of the aforesaid reference, triggering or resetting occurring by the negative-going spikes thus developed. Output voltages may be derived, as is well known, from both the anode and the suppressor grid of each valve, the anode voltage of the left hand valve in the aforesaid Figures 4–8 of the reference moving in a positive direction when the circuit is triggered and in a negative-going direction when the circuit is reset. The suppressor grid voltage of the same valve moves in converse or antiphase sense, going negative when the circuit is triggered and more positive when the circuit is reset. The corresponding voltages in the other, right hand valve, are again in converse or antiphase relationship to those of the left hand valve, the anode voltage moving negatively when the circuit is triggered and positively when the circuit is reset and the suppressor grid voltage moving positively when the circuit is triggered and negatively when it is reset. There are thus available two similar outputs, one from the suppressor grid of the left hand valve and one from the anode of the right hand valve which move negatively when the circuit is triggered and positively when the circuit is reset and two further similar output voltages, one from the anode of the left hand valve and one from the suppressor grid of the right hand valve which are in exact antiphase relationship, moving positively when the circuit is triggered and negatively when the circuit is reset. In the symbols shown in Figure 2 the output terminal *s*1 is that connected to the suppressor grid of the left hand valve and the output terminal *s*2 is that connected to the suppressor grid of the right hand valve. Similarly, the output terminal *a*1 is that connected to the anode of the left hand valve and the output terminal *a*2 is that connected to the anode of the right hand valve.

The output terminal *s*2 of the first trigger circuit TRC1 is coupled through a delay network DLN1, which imposes a delay of the order of 1 microsecond, to the triggering input terminal *t* of the next following stage TRC2. The delay network DLN1 is conveniently of the electromagnetic type described in "Components Handbook," vol. 17 of the Radiation Laboratory Series, M. I. T., 1949, chapter 6. The remaining trigger circuits are similarly interconnected through delay networks DLN2–DLN79 similar to that of the network DLN1. The resetting input terminal *r* of each trigger circuit is connected to a common lead 10 to which may be applied from a suitable source 20 and by way of a controlling gate 21, a train of resetting pulses of the form shown in diagram (*b*) of Fig. 3 and each consisting of a sharp pulse of less than 1 microsecond duration occurring just after the termination of the 5 microsecond "1" digit-pulse period of the 8 microsecond digit-period. Such resetting pulses may conveniently be derived from the trailing edges of the Dash pulses found in the machine of the prior specification last referred to, which Dash pulses correspond in form to the "1" digit representing pulses. The gate 21 is conveniently of the well known multiple diode form as described and shown in the article "Digital Computer Switching Circuits," by S. H. Page in "Electronics," September, 1948, pages 110–118. For use with the negative-going pulse signals of the present device a circuit of the form shown in Figure 2(F) on page 112 is particularly convenient. The separate input leads to such gate devices, denoted by an arrow head leading towards the circular symbol are each connected to the anode of a separate diode as shown in the reference, while the output lead, denoted by an arrow head leading away from the symbol is connected to the cathode of the final triode valve of the reference which is arranged as a cathode follower with a cathode load resistance in conventional manner.

Initial insertion of the multiplicand number into the first 40 stages of the register constituted by the trigger circuits TRC1–TRC80 is effected by the supply of such number from a suitable source 22, such as the main store or the accumulator store of said earlier machine, over lead 23 which is connected by way of gate circuits ING1, ING2–ING40 to the triggering input terminals *t* of the respective trigger circuits TRC1–TRC40. Each of the gate circuits ING1–ING40 resembles that of gate 21 and is controlled by an individual waveform resembling the p-Pulse waveform series of said earlier machine and consisting respectively, as illustrated in diagrams (*c*), (*d*) and (*e*), Fig. 3, of a single pulse coincident in timing with the "1" digit-pulse period of a different one of 40 successive digit periods. For instance gate ING1 is suppled wth the p0-Pulse waveform of diagram (*c*) Fig. 3 and is accordingly opened in synchronism with the first digit-pulse period and allows any "1" digit pulse in that position of the signal train representing the multiplicand number to set the associated trigger circuit TRC1 into triggered or "1" representing condition. Similarly the remaining gates select the remaining digit-pulse periods so that, after the application of the multiplicand signal train from source 22 simultaneously with the p-Pulse waveform series from source 24 over multiple conductor 25, the resultant triggered and untriggered states of the respective trigger circuits TRC1–TRC40 represent the various digits of the multiplicand number with the least significant digit held in the first circuit TRC1.

The interconnection of the trigger circuits TCR1–TCR80 through delay networks DLN1–DLN79 is such that, upon resetting of any stage from the "1" stage to the "0" stage by application of a resetting pulse over lead 10 to its terminal *r*, the next following stage is caused to be triggered by the output pulse fed through the delay network. In consequence the multiplicand number introduced as described into the first 40 stages can be successively moved up, stage-by-stage, until it is held in trigger circuits TRC41–TRC80 by the application of 40 successive resetting pulses as shown in diagram (*b*) Fig. 3.

The above described shifting register also forms the addend register of the parallel adder circuit shown in the remainder of Fig. 2. This adder circuit comprises 80 substantially similar stages each including a second electronic trigger circuit TCB1, TCB2–TCB80 constituting the final sum-register of the device. Each of these trigger-circuits is arranged, in well known manner and as is described in vol. 19, "Waveforms," of the Radiation Laboratory Series, M. I. T., 1949, page 187, with a common trigger/reset input terminal 26 to the anodes of the two valves of the circuit so that successive pulses change the circuit from one state to another and back again. This common trigger input is connected by way of lead 27 through a normally closed gate circuit GA1, GA2–GA80 to a lead 11 carrying the pulse signal train representing the multiplier number, e. g. the waveform of diagram (*a*) Fig. 3. Each gate GA1, GA2–GA80, which again resembles the gate 21, is controlled by one output of the associated trigger circuit TRC1, TRC2–TRC80 so as to be open only when the latter circuit is in the "1" representing condition.

In the operation of the parts described so far and which are concerned only with pure addition without carry, the number held in the addend register of trigger circuits TRC1–TRC80 will be fed to the sum register of trigger circuits TCB1–TCB80 only when those digits of the multiplier number representing "1" are on lead 11. Since shifting of such number within the register of trigger circuits TRC1–TRC80 by one stage takes place in between the instants of occurrence of each digit-pulse period of the multiplier signal, the multiplicand number is effectively increased in its significance in conformity with the significance of the next digit position of the multiplier signal and is added if such multiplier signal contains a "1" in that position and is not added if it contains a "0" in such position.

The arrangements for dealing with "carry" digits within the adder comprise the provision of a source 28 of "carry" control pulses which are of the form shown in diagram (*f*) Fig. 3 and which consist of a narrow pulse timed to commence slightly, say 1½ microseconds, before the end of the 5 microsecond digit-pulse period. Such "carry"-control pulses are supplied by way of lead 12 to each of normally-closed gates GC1–GC79 also similar to gate 21 and associated respectively with stages 1 to 79 of the adder. Output from each of these gate circuits is applied by way of a delay network DNW1, DNW2–DNW79 each of similar form to the network DLN1–DLN79 already referred to but imposing a delay of, say, 3 microseconds, to the common triggering input terminal 26 of the trigger circuit TCB2, TCB3–TCB80 of the next stage and also, by way of the phase-inverter circuit INV1–INV78 to a further gate circuit GD2–GD79 which is normally closed and is controlled by one of the outputs of the trigger circuits TCB2–TCB79 of the associated stage so as to be open only when such trigger circuit is in the "1" representing stage. Such gate circuits again resemble the gate 21 while the phase inverter circuits are each of the wholly conventional form comprising a normal thermionic valve having an anode load and with the input applied to its control grid and the output derived from its anode. A description will be found in the aforesaid reference "Ultra High Frequency Techniques," Brainerd et al., at pages 100–101.

The gate circuits GC1–GC79 are controlled by the condition of further "sensing" gates GB1–GB79 which are each conveniently of the type described in the aforesaid reference "Electronics," September, 1948, pages 110–118 and as shown in Figure 2(E) with the output derived from the anode of the output valve. These gates are each supplied respectively with the outputs from terminals *a*1 and *s*2 of the trigger circuits TRC1 and TCB1, TRC2 and TCB2—and so on of the associated stages so as to provide an output which opens the gates GC1, GC2–GC79 only when the trigger circuit of the addend register is in the "1" state and the associated trigger circuit of the sum-register is in the "0" state.

Operation of the "carry" arrangements is initiated by the arrival of a "carry-control" pulse on lead 12 immediately after the previously described pure addition operation has been completed. If any gate GC1–GC79 is open, due to the addend register being in the "1" state and the sum-register being in the "0" state (which means it also was previously in the "1" state before the pure addition) such "carry" pulse passes throught the gate and, after undergoing the delay of networks DNW1–DNW79, causes reversal of the next following trigger circuit of TCB2–TCB80 of the sum-register.

If, however, such next following trigger circuit is already in the "1" state which implies that a further "carry" will later be necessary as a result of adding-in the first "carry," then the associated gate GD2–GD79 will also be open and the first described carry pulse will also pass by way of the phase inverter direct to the junction point 29 where it will be similarly effective upon the next following stage but one. In this way the cumulative relays which normally occur when a carry operation is propagated through several stages is avoided and the completed parallel addition operation including the requisite "carry" digit propagation is completed well before the instant of commencement of the next digit-period.

The reading out of the resultant sum from the sum-register of trigger-circuits TCB1–TCB80 in serial form may be effected in similar manner to the initial reading-in of the multiplicand to the addend register by way of gates, ONG1–ONG80, which again resembles the gate 21 and are controlled respectively by the related *p*-Pulse waveform, to a common lead 30 or alternatively the sum is available in parallel form on leads OL1–OL80.

Subsequent clearing of the sum-register is effected by applying one or more reset pulses over lead 31 while clearing of the addend register may be effected by applying a series of 40 resetting pulses to lead 10 or alternatively by applying a prolonged pulse of greater length than the 1 microsecond delay time of networks DLN1–DLN79, to such lead 10. Numerous modifications are clearly possible. For example the addend register of the parallel adder may be separate from the shifting register and comprise a series of trigger circuits controlled as to their state by connection to the shifting register through gates controlled by the multiplier number signal. In this case, the gates GA1–GA80 of the parallel adder need to be supplied with an "add-control" pulse train comprising a series of short pulses each commencing shortly after the beginning of each digit-pulse period.

Instead of effecting the initial reading-in of the multiplicand in the manner described, this may be inserted by feeding the multiplicand number word in reverse serial form to the triggering input of the first stage of the shifting register while a train of resetting pulses is fed to the lead 10 until the complete number occupies the initial 40 stages. Alternatively the number word may be similarly fed in its correct form to the 80th stage and means provided for reversing the direction of shift performed by the register.

I claim:

1. An electronic device for effecting multiplication of two binary numbers each of *n* digits length and each represented by electric signals of which that representing the multiplier number is constituted by a pulse signal train, which comprises a shifting register of at least 2 *n* stages, each stage comprising an electric trigger circuit arrangement having at least one output terminal for providing an output potential having characteristically different values according to whether the state of said trigger circuit is representative of binary value "1" or binary value "0," circuit means including time delay means interconnecting each stage except the last stage to the next higher order stage for transmitting a triggering pulse to such higher order stage when the lower order stage is reset, and a shift control pulse input terminal connected to each of said trigger circuits for causing the resetting of any triggered stage and the consequent advancement of any setting condition of said register by one stage at a time upon application of a shift signal to said terminal, setting means for conditioning the first *n* stages of said register to record the multiplicand number, a parallel adder of at least 2 *n* stages, each stage comprising an electric trigger circuit having an input triggering terminal and at least one output triggering terminal for providing an output potential having characteristically different values according to whether the state of said adder stage is representative of binary value "0" or binary value "1," a plurality of gate circuits, one for each stage of said register, means for applying said multiplier signal pulse train as a simultaneous control potential for each of said gate circuits whereby said gates are opened for a "1" representing signal in said train and closed at all other times, circuit connections from said output terminal of each trigger circuit of said shifting register stages to said input triggering terminal of the trigger circuit of the related stage of said parallel adder through the related one of said gate circuits whereby the instantaneous condition of said shifting register is transferred as a parallel input to said parallel adder on the occurrence of each "1" digit-representing signal in said multiplier number signal, a source of pulses occurring one during each interdigit time period of said multiplier pulse signal train and means for applying said pulses as a shift signal to said shift control terminal of said shifting register whereby, each trainsfer of the multiplicand number initially recorded in said shifting register occurs after multiplication by that power of the binary scale which corresponds to the power of the "1" digit of the multiplier number whose representing signal initiates the transfer.

2. An electronic device according to claim 1 wherein said multiplicand number is represented by a pulse signal train and which includes a plurality of further gate circuits, one for each of said first *n* stages of said shifting register, control means for opening said gate circuits successively, one during each of the digit periods of said multiplicand number-representing signal, circuit connections for supplying said multiplicand number-representing signal in parallel to each of said further gate circuits and circuit connections for conducting the output from each of said further gate circuits to the said register stage which is associated therewith.

3. An electronic device for effecting multiplication of two binary numbers each of *n* digits length and each represented by electric signals, at least one of said signals being in the form of an electric pulse signal train, which comprises a shifting register having at least 2 *n* stages, each of said stages including a bi-stable electronic trigger circuit having at least a first and a second output terminal each providing an output potential which is characteristically different in accordance with the conditioning of said trigger circuit into its triggered state representative of binary value "1" or into its reset state representative of binary value "0," a second group of at least 2 *n* bi-stable electronic trigger circuits associated one with each of said separate stages of said shifting register, said second group triggered circuits each having a common triggering input terminal for reversing its condition with each applied triggering pulse and having at least a first and a second output terminal each providing an output potential having characteristically different values in accordance with the conditioning of said trigger circuit into its triggered condition representative of binary value "1" or into its reset state representative of binary value "0," means for conditioning each of the first *n* stages of said shifting register in accordance with the respective *n* digits of the multiplicand number, a plurality of first AND gate circuits, one for each of said register stages, and controlled by the output potential from said first output terminal of such stage so as to be opened when said stage is in its binary "1" representing condition and closed at all other times, means for supplying the multiplier number as a pulse signal train to each of said first AND gates in parallel, connection means between the output terminals of each of said first AND gates and the common triggering input of the second group trigger circuit which is associated with the same register stage, means for effecting a single stage shift operation at each stage of said shifting register which is in its triggered state during each inter-digit period of said multiplier number-representing pulse signal train, a source of carry digit-representing pulses, one for each digit interval of said multiplier number-representing pulse signal train, a plurality of second AND gates, one for each of said register stages except the last stage, said second AND gates being controlled by output potentials from said second output terminal of the register trigger circuit and from said first output terminal of the second group trigger circuit of the same stage to provide an output control potential therefrom when said register trigger circuit is in its "1" representing state and said second group trigger circuit is in its "0" representing state, a plurality of third AND gates, one for each register stage except the last stage, means for supplying the output potential from said second AND gate of the associated register stage as a control potential to said third AND gate, means for supplying carry pulses from said source to each of said third AND gates in parallel, a plurality of delay devices one for each of said third AND gates and circuit means for applying the output of each of said third AND gate circuits through said delay device to the triggering input of that second group trigger circuit which is associated with the register stage of next higher binary significance.

4. An electronic device according to claim 3 which includes a plurality of fourth AND gate circuits, one for each stage of said register device except the first and last stages, means for applying an output potential from said first output terminal of the second group trigger circuit of the same stage as a control potential for said fourth AND gate circuit whereby said gate circuit is opened only when said second group trigger circuit is in its binary value "1" representing condition and circuit means interconnecting the output of said third AND gate of each stage to the output of the third AND gate of the following stage of the next higher binary significance through said fourth AND gate of the same stage whereby carry digit propagation is effected simultaneously when necessary through more than one successive stage by way of those of said fourth AND gates which are opened.

5. An electronic device for effecting multiplication of two binary numbers each of $n$ digits length and each represented by electric pulse trains wherein the binary "1" digit value is signalled by the presence of a pulse and the binary "0" digit value by the absence of such a pulse in each of the $n$ successive digit intervals of progressively increasing binary significance of such trains, which comprises a shifting register having at least 2 $n$ stages, each of said stages including a bi-stable electronic trigger circuit having a triggering input terminal, a resetting input terminal and at least a first and a second output terminal each providing an output potential which is characteristically different in accordance with the conditioning of said trigger circuit into its triggered state representative of binary value "1" or into its reset state representative of binary value "0," a plurality of first AND gate circuits, one for each of the first $n$ stages of said shifting register, means for opening each of said first AND gates in turn, one during each of the successive digit intervals of said multiplicand representing pulse train, an input lead supplying said multiplicand representing pulse train to each of said first AND gates in parallel, connections between the output terminals of each of said first AND gates and said triggering input terminal of the associated register trigger circuit, a source of shift pulses, one during each of the digit intervals of said multiplier-representing pulse train at instants subsequent to any binary "1" representing pulse therein, means for applying said shift pulses to said resetting terminal of each of said stages of said shifting register, a second group of at least 2 $n$ bi-stable electronic trigger circuits associated one with each of said separate stages of said shifting register, said second group triggered circuits each having a common triggering input terminal for reversing its condition with each applied triggering pulse and at least a first and a second output terminal each providing an output potential having characteristically different values in accordance with the conditioning of said trigger circuit into its triggered condition representative of binary value "1" or into its reset state representatve of binary value "0," a plurality of second AND gate circuits, one for each of said register stages, connection means for controlling said second AND gate circuits by an output potential from said first output terminal of the trigger circuit of such stage so as to be opened when said trigger circuit is in its binary "1" representing condition and closed at all other times, means for supplying the multiplier number representing pulse train to each of said second AND gates in parallel, connection means between the output terminals of each of said second AND gates and the common triggering input of the second group trigger circuit which is associated with the same register stage, a source of carry digit control pulses, one during each digit interval of said multiplier number-representing pulse train at an instant preceding said shift pulses, a plurality of third AND gates, one for each of said register stages except the last stage, said third AND gates being controlled by output potentials from second output terminals of the register trigger circuit and the said first output terminal of the second group trigger circuit of the same stage to provide an output control potential therefrom when said register trigger circuit is in its binary "1" representing state and said second group trigger circuit is in its binary "0" representing state, a plurality of fourth AND gates, one for each register stage except the last stage, means for supplying the output potential from said third AND gate of the associated stage as a control potential to said fourth AND gate, means for supplying carry digit control pulses from said source to each of said fourth AND gates in parallel, a plurality of delay devices one for each of said fourth AND gates, circuit means for applying the output of each of said fourth AND gate circuits through said delay device to the triggering input of that second group trigger circuit which is associated with the register stage of next higher binary significance, a plurality of fifth AND gates, one for each register stage, a product signal output lead, means connecting said second output terminal of each of said second group trigger circuits to said output lead by way of the associated one of said fifth AND gates and means for opening each of said fifth AND gates in turn, one during each of $2n$ successive digit intervals subsequent to said multiplier number-representing pulse train to generate a product-representing pulse train.

6. An electronic multiplying circuit as claimed in 1 wherein said parallel adder circuit includes means for effecting simultaneous carry-digit propagation through more than one successive stage.

References Cited in the file of this patent

UNITED STATES PATENTS

| | | |
|---|---|---|
| 2,404,047 | Flory et al. | July 16, 1946 |
| 2,409,689 | Morton et al. | Oct. 22, 1946 |
| 2,445,215 | Flory | July 13, 1948 |

OTHER REFERENCES

"A Digital Computer for Scientific Applications," by C. F. West and J. E. Deturk; Proceedings of the I. R. E.; Dec. 1948; pages 1452–1460.